United States Patent [19]
Brant

[11] 4,405,217
[45] Sep. 20, 1983

[54] FILM SPEED CONTROL SYSTEMS FOR HIGH SPEED MOTION PICTURE CAMERAS

[75] Inventor: Gordon W. Brant, Sunnyvale, Calif.

[73] Assignee: Redlake Corporation, Campbell, Calif.

[21] Appl. No.: 298,388

[22] Filed: Sep. 1, 1981

[51] Int. Cl.³ .................. G03B 1/00; G03B 41/00
[52] U.S. Cl. ........................................ 352/84; 352/180
[58] Field of Search ............................... 352/84, 180

[56] References Cited

U.S. PATENT DOCUMENTS

| | | | |
|---|---|---|---|
| 2,523,722 | 8/1950 | Beaman | 352/84 |
| 3,259,448 | 7/1966 | Whitley et al. | 352/84 |
| 3,597,060 | 8/1971 | Beaman | 352/84 |
| 3,790,262 | 2/1974 | Van Derwater, Jr. | 352/84 |
| 4,008,425 | 2/1977 | Dickey | 318/314 |

OTHER PUBLICATIONS

*Linear Databook*, National Semiconductor Corporation, 1980, pp. 9-79 through 9-91.

*Electronics Designers' Handbook*, (2nd Ed.), edited by L. J. Giacoletto, 1977, Sections 19.3, 19.5.

Hycam ® *Instruction Manual*, Redlake Corporation, 1972, Sections 2, 4-1 through 4-3; FIG. 4-1; Schematic Diagrams; Voltages and Wave Forms Charts.

HYCAM II *Operating Instructions and Illustrated Parts List List*, Redlake Corporation, Jan. 1981, Sections 2.0.4–2.2.2, FIG. 18, FIG. 22, Sections 10.0 to 11.0, FIGS. 36, 37.

*Primary Examiner*—Michael L. Gellner
*Attorney, Agent, or Firm*—Schapp and Hatch

[57] ABSTRACT

The disclosed film speed control system for high speed motion picture cameras includes an actual film speed signal source, a selected film speed signal source, a charge pump integrated circuit responsive to the actual film speed signal to produce an output signal linearly related to the actual film speed signal, and a comparing circuit for comparing the charge pump output signal with the selected film speed signal.

14 Claims, 13 Drawing Figures

FILM SPEED CONTROL SYSTEMS FOR HIGH SPEED MOTION PICTURE CAMERAS

BACKGROUND OF THE INVENTION

1. Field of the Invention

The present invention relates to film speed control systems for high speed motion picture cameras, and more particularly to improved electronic circuits for use in such systems.

2. Description of Prior Art

The term "prior art" as used in this specification and in any related statements made by or on behalf of the inventor or his assignee means only that the document or thing referred to as prior art bears, directly or indirectly, a date which is earlier than the filing date of this specification.

Film speed control systems for high speed motion picture cameras and electronic circuits for use in the same are known in the prior art. For example, a film speed control system for a Redlake HYCAM ® camera, including an electronic control circuit, is shown and described in the below-cited U.S. Pat. of Don L. Beaman, No. 3,523,722. Another film speed control system for a Redlake HYCAM ® camera, including an electronic control circuit, is shown and described in the HYCAM II ® manual published by the Redlake Corporation in January of 1981.

Some prior art film speed control systems for high speed motion picture cameras have required more calibration time during production than is desirable, and some have required frequent recalibration.

Further, the electronic control circuit portions of some prior art speed control systems for high speed motion picture cameras have been very sensitive to differences between or changes in the mechanical characteristics of the high speed motion picture cameras in which they were employed.

Yet further, the electronic circuit portions of some prior art film speed control systems for high speed motion picture cameras have been undesirably complex, and therefore have been markedly lacking in inherent reliability and expensive to manufacture. Additionally, some of said prior art film speed control systems for high speed motion picture cameras have been undesirably sensitive to hostile environmental factors, such as vibration.

Also, the electronic control circuit portions of some prior art film speed control systems have not been readily interchangeable from camera to camera without recalibration.

Also, some prior art film speed control systems for high speed motion picture cameras have not provided regulated speed operation at frame rates in excess of 5,000 frames per second.

In addition, the event triggers of some prior art film speed control systems for high speed motion picture cameras have been undesirably lacking in accuracy of operation.

Also, in some prior art film speed control systems for high speed motion picture cameras, the starting and stopping delay times have been undesirably long, and have not been precisely repeatable.

Lastly, some prior art film speed control systems for high speed motion picture cameras have not been adaptable to battery operation.

It is believed that the documents and things listed immediately below contain information which is or might be considered to be material to the examination of this patent application.

U.S. Pat. Nos. 4,008,425, 3,790,262, 3,597,060, 3,259,448, 3,523,722,

Linear Databook, National Semiconductor Corporation, 1980, pp. 9–79 through 9–91; the HYCAM ®, FASTAX ®, LOCAM ®, and other camera manuals issued by the Redlake Corporation, and any other documents or things referred to hereinbelow.

No representation is made that a search has been made in connection with any particular invention claimed herein, or that no more pertinent information exists with respect to any such claimed invention.

SUMMARY OF THE INVENTION

Accordingly, it is an object of the present invention to provide film speed control systems for high speed motion picture cameras which require less initial calibration time than do the film speed control systems for high speed motion picture cameras of the prior art.

Another object of the present invention is to provide film speed control systems for high speed motion picture cameras which seldom if ever require recalibration.

Yet another object of the present invention is to provide film speed control systems for high speed motion picture cameras which are insensitive to the mechanical characteristics of the cameras in which they are employed, to a degree not achieved in such prior art film speed control systems.

A further object of the present invention is to provide film speed control systems for high speed motion picture cameras which are characterized by the use of less parts than prior art film speed control systems for high speed motion picture cameras, and thus are characterized by relatively low cost and greater inherent reliability than the film speed control systems for high speed motion picture cameras of the prior art.

A yet further object of the present invention is to provide film speed control systems for high speed motion picture cameras which have greater ability to withstand hostile environmental factors, such as vibration, than do prior art film speed control systems for high speed motion picture cameras.

An additional object of the present invention is to provide film speed control systems for high speed motion picture cameras in which the electronic control circuit portions are interchangeable from camera to camera of the same type without recalibration.

Another object of the present invention is to provide film speed control systems for high speed motion picture cameras which are adaptable to battery operation.

Another object of the present invention is to provide event triggers for high speed motion picture cameras which are characterized by greater accuracy than has been achieved in event triggers of the prior art.

Yet another object of the present invention is to provide a film speed control system for high speed motion picture cameras in which the start and stop delay times are both shorter and more precisely repeatable than the start and stop delay times of prior art high speed motion picture camera film speed control systems.

A yet further object of the present invention is to provide a film speed control circuit for high speed motion picture cameras whereby the maximum power which can be supplied to the drive motors of said cameras is limited to safe levels.

Other objects of the present invention will in part be obvious, and will in part appear hereinafter.

The present invention, accordingly, comprises the features of construction, combinations of elements, and arrangements of parts which will be exemplified in the constructions hereafter set forth, and the scope of the invention will be indicated in the appended claims.

In accordance with a principal feature of the present invention, the actual speed signal of a film speed control system for high speed motion picture cameras is converted to a voltage signal the amplitude of which represents its repetition rate by means of a uniquely linear charge pump circuit.

In accordance with yet another principal feature of the present invention, said amplitude is substantially linearly related to said repetition rate over a range extending to more than 10,000 frames per second or 40,000 pulses per second.

In accordance with an additional principal feature of the present invention, the event trigger circuit of a film speed control system for high speed motion picture cameras comprises a hysteritic circuit for producing a dead zone in the actual speed signal received by said event trigger circuit and a highly linear charge pump circuit.

In accordance with yet another principal feature of the present invention, the comparator of a film speed control system for high speed motion picture cameras is provided with output signal range limiting means whereby the maximum power supplied to the drive motors of said cameras is maintained within safe limits.

For a fuller understanding of the nature and objects of the present invention, reference should be had to the following detailed description of the preferred embodiment of the present invention, taken in connection with the accompanying drawings.

DETAILED DESCRIPTION OF THE PREFERRED EMBODIMENT

Figure 1:
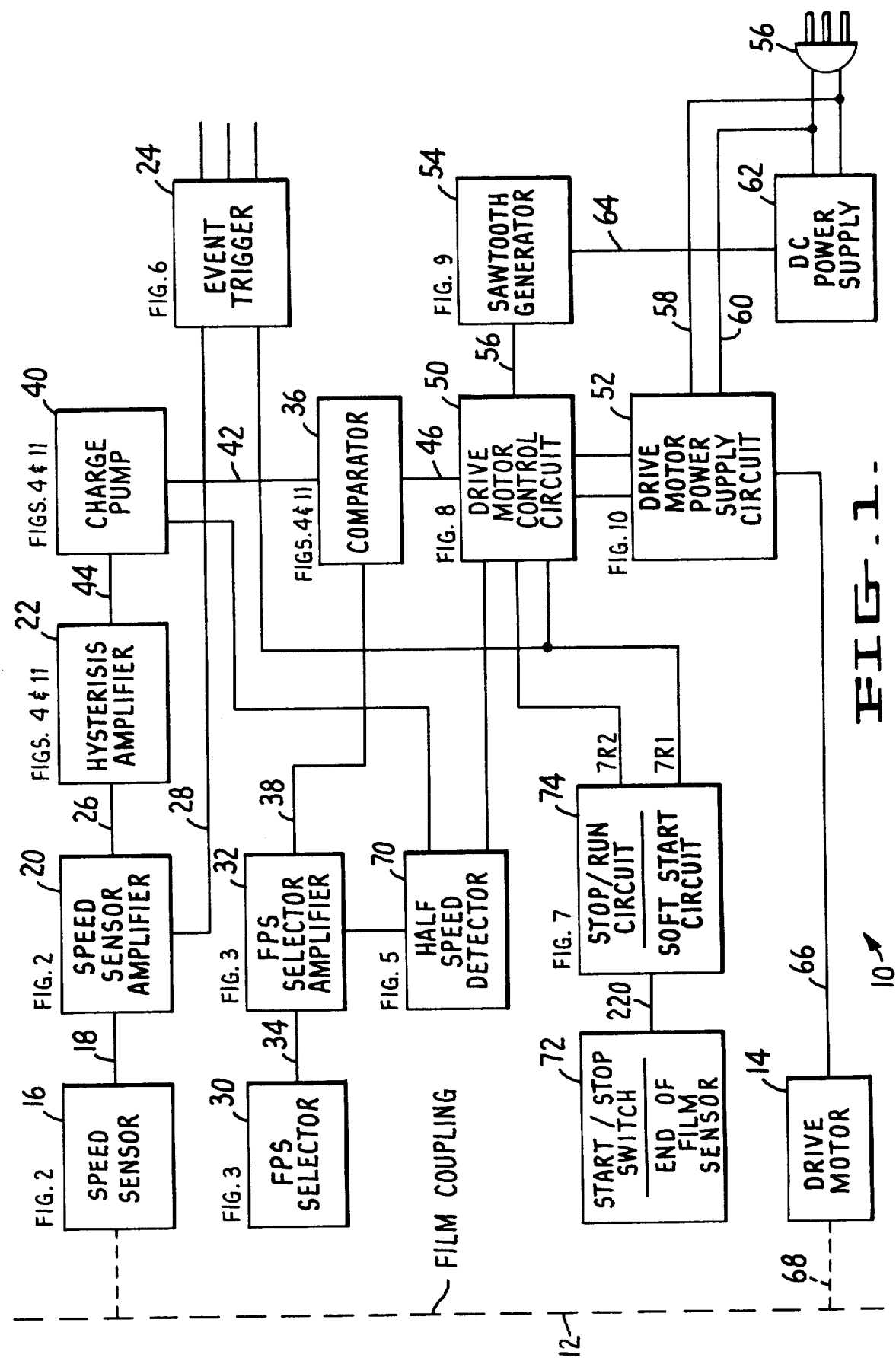
FIG. 1 is a schematic block diagram generally representing film speed control systems embodying the present invention.

Referring now to FIG. 1, there is shown a schematic block diagram of a film speed control system for high speed motion picture cameras 10 embodying the present invention.

Film speed control system 10 is particularly adapted for use in a rotating prism camera of the general type shown and described in U.S. Pat. Nos. 3,259,448, issued to E. M. Whitley, et al., on July 5, 1966, and 3,523,722, issued to D. L. Beaman on Aug. 11, 1970. Rotating prism cameras of this general type are made and sold by the Redlake Corporation of Campbell, Calif., U.S.A., under the registered trademarks HYCAM and HYCAM II.

While the film speed control system of FIG. 1 is particularly adapted for use in rotating prism cameras of the general type described above, which will hereinafter be called HYCAM cameras, it is to be understood that the teachings of the present invention can readily be applied to other high speed motion picture cameras, such as the FASTAX ® cameras made and sold by the Redlake Corporation, by those having ordinary skill in the high speed motion picture camera art without invention and without extensive experimentation. (FASTAX is a registered trademark of the Redlake Corporation.)

The dashed line 12 of FIG. 1 represents the film coupling mechanism of the HYCAM ® type camera, as typified in said U.S. Pat. No. 3,523,722. As shown and described in that patent, the film in a HYCAM ® type camera passes from a feed spool to a take-up spool which is rotated by an electric motor. The prism and shutter assembly of the camera comprises a sprocket which engages with the sprocket holes of the film, thereby rotating the prism and shutter assembly in synchronism with the passage of the film through the film gate. This prism and shutter assembly, or rotating prism assembly, includes a ring provided on its outer face with elements of alternating reflectivity adapted for cooperation with an infrared light source and a corresponding photocell for producing a pulse train signal representing the speed of the film. The mechanism just described will be referred to herein as the film coupling, and is represented schematically by dashed line 12 in FIG. 1. Drive motor 14 of FIG. 1 is the take-up spool drive motor of a HYCAM ® type camera having as its film speed control system the film speed control system of FIG. 1. Speed sensor 16 of FIG. 1 comprises a light-emitting diode and a phototransistor which cooperate with the alternating reflectivity ring of the prism and shutter assembly of the camera to provide a pulse train signal representing the instantaneous speed of the film passing through the film gate of the camera.

Figure 2:
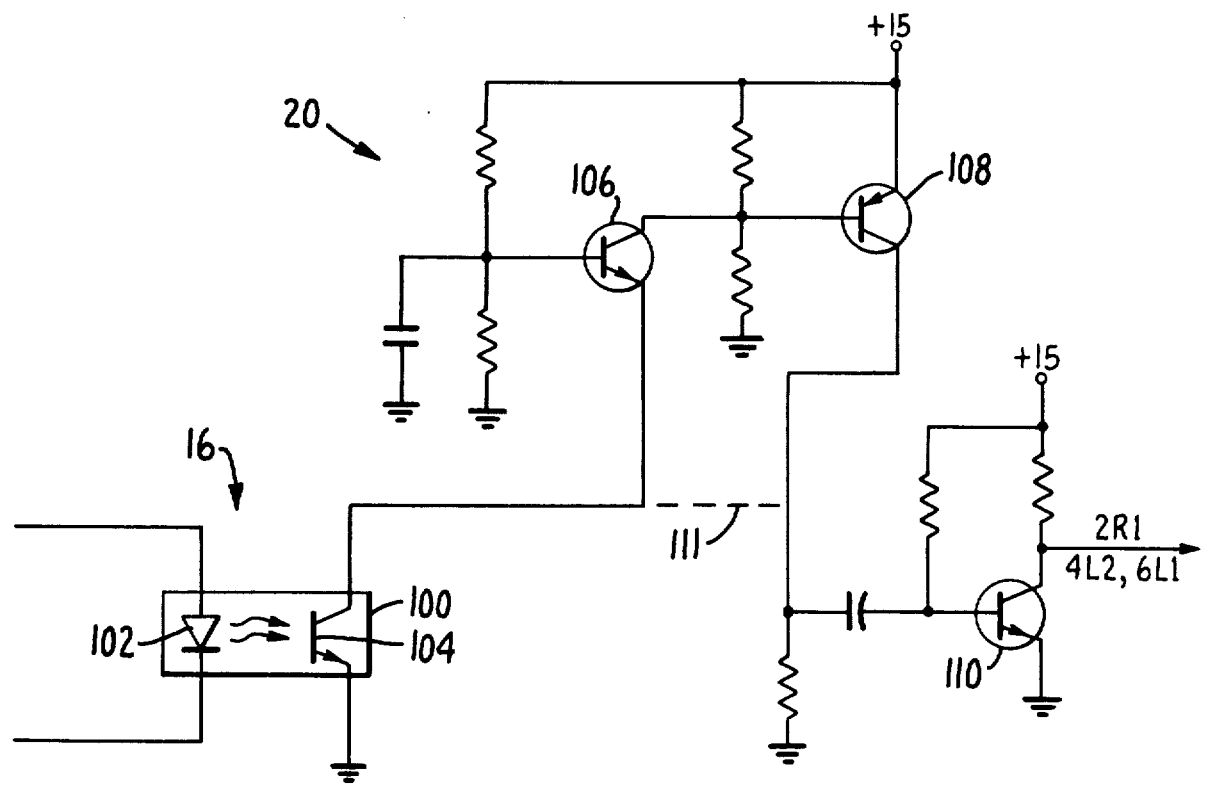
FIGS. 2 through 10 together constitute a schematic diagram of the circuit of the preferred embodiment of the present invention.

Referring again to FIG. 1, it will be seen that the rectangle or block representing speed sensor 16 is identified with FIG. 2 of the present drawings by the notation "FIG. 2" located directly above it. Several other blocks of the schematic block diagram of FIG. 1 are similarly referred to the corresponding figures of the present drawings.

As described hereinafter, speed sensor 16 serves to provide on interconnection 18 a pulse train signal which comprises four pulses, i.e., pulse wavetrain cycles, per picture in full frame models of the HYCAM ® cameras. Other pulse rates per picture may obtain when the film speed control system of the present invention is adapted to other high speed motion picture cameras.

As shown in FIG. 1, film speed control system 10 also includes a speed sensor amplifier 20, which serves in general to increase the amplitude of and render more definite the pulses of the train produced by said phototransistor.

As further seen in FIG. 1, speed sensor amplifier 20 supplies its film speed representing output pulse train signal to a hysterisis amplifier 22 and an event trigger 24 via interconnections 26 and 28, respectively.

The FPS (frames per second of film speed) selector represented by block 30 comprises three digital selector switches of well-known type, whereby the operator of the camera can select the desired film speed over a range, e.g., of 20 to 11,000 frames per second, in increments of 10 frames per second. The FPS selector amplifier represented by block 32 of FIG. 1 and shown in detail in FIG. 3 serves to provide an analog voltage signal representing the desired film speed, in response to the corresponding current signal produced by FPS selector 30 in interconnection 34.

The desired film speed signal produced by the FPS selector amplifier represented by block 32 is supplied to a comparator represented by block 36, via interconnection 38.

In addition to the desired film speed signal, comparator 36 is also supplied with an actual film speed representing signal by wide range linear charge pump 40, via interconnection 42. Charge pump 40 is responsive to a signal provided by hysterisis amplifier 22 via interconnection 44.

In the manner generally well known in the servosystem art, comparator 36 compares the desired film speed signal and the actual film speed signal and produces a corresponding error signal on interconnection 46.

It is to be understood that the wide linearity range charge pump 40 constitutes a principal feature of the present invention, whereby particular ones of the objects of the present invention set out hereinabove are principally achieved.

As further seen in FIG. 1, the error signal on interconnection 46 is supplied to a drive motor control circuit 50, which itself serves to control the operation of a drive motor power supply circuit 52, and thereby to control the speed of film drive motor 14.

The drive motor power supply circuit represented by block 52 is a silicon-controlled rectifier circuit which is in general of well-known type. In the well-known manner, drive motor control circuit 50 is supplied with a sawtooth wave signal by a sawtooth generator 54 via interconnection 56, the individual pulses of this sawtooth wave signal being synchronized with the alternating current power supplied to the drive motor power supply circuit 52 via plug 56 and conductors 58 and 60 in the well-known manner.

The direct current power supply represented by block 62 includes, in the well-known manner, a full-wave bridge rectifier, and a full-wave rectified output signal taken therefrom is supplied as the exciting signal to sawtooth generator 54, via interconnection 64.

Drive motor power supply circuit 52 supplies operating power to drive motor 14, via interconnection 66. Drive motor 14 is coupled to film coupling 12 via mechanical coupling means 68.

Film speed control system 10 also comprises (FIG. 1) a half speed detector, represented by block 70, which serves to shut down the camera if the actual film speed does not reach one half of the selected film speed within an allotted time interval, e.g., about two seconds, determined by a resistor-capacitor pair. This half speed detector also serves to prevent damage to the camera due to film breakage, which does not actuate the end-of-film sensor.

Figure 5:
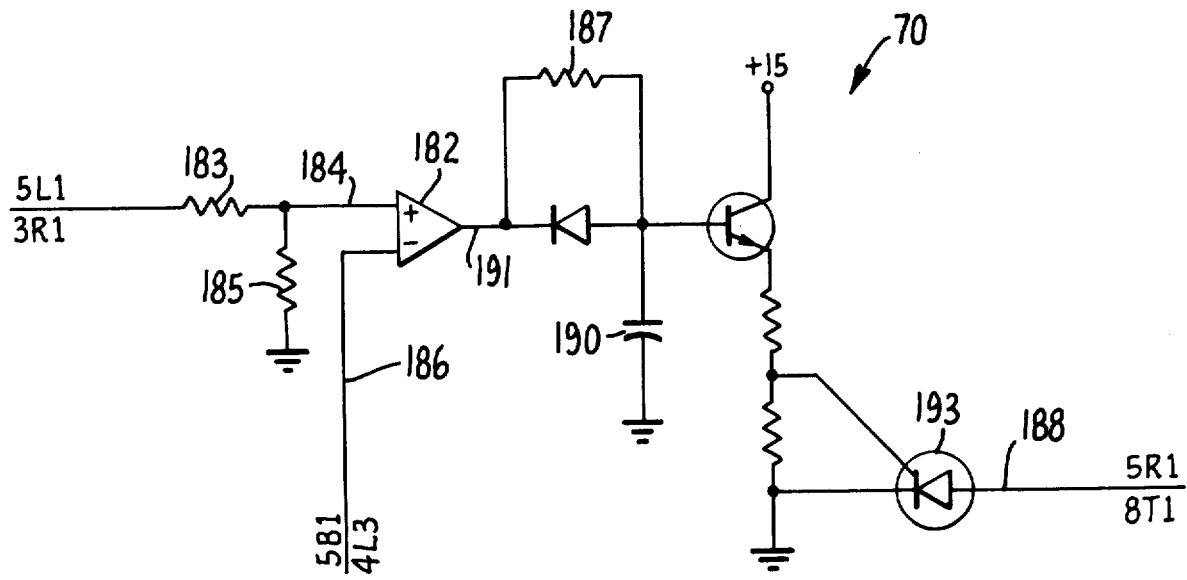

It is to be understood that the particular half speed detector arrangement shown in FIG. 5 constitutes a particular feature of the present invention.

Event trigger 24 functions in general in the well-known manner of the event triggers of prior art high speed motion picture cameras. It is to be understood, however, that the particular event trigger arrangement shown in FIG. 6 constitutes a particular feature of the present invention.

As seen in FIG. 1, film speed control system 10 further comprises a start/stop switch and an end of film sensor, both represented by block 72. Neither the start/stop switch nor the end of film sensor constitutes a particular feature of the present invention, and thus neither is particularly illustrated herein. It is to be understood, however, that the start/stop switch and the end of film sensor represented by block 72 serve to control the operation of the stop/run circuit and the soft start circuit which are both represented by block 74 in FIG. 1. The stop/run circuit and the soft start circuit represented by block 74 both constitute particular features of the present invention.

Referring now to FIG. 2, it will be seen that speed sensor 16 comprises a combination 100 of a light-emitting diode 102 and a phototransistor 104, such as that sold under the commercial designation TIL139.

In the HYCAM ® camera of the preferred embodiment of the present invention shown and described herein, light from light-emitting diode 102 falls upon the pattern-marked outer face of a ring which itself is a part of and rotates with the prism and shutter assembly of the camera. Part of the light reflected from the pattern-marked outer face of said ring falls upon phototransistor 104 and thus modulates the collector-emitter circuit current of phototransistor 104, providing a rectangular wave current signal the repetition rate of which is proportional to the film speed.

As further seen in FIG. 2, speed sensor amplifier 20 is a three-stage amplifier, comprising transistors 106, 108, and 110. Transistor 106 may be thought of as an impedance matching device which serves to compensate for the very low circuit of phototransistor 104. In another sense, phototransistor 104 functions as a variable impedance in the emitter circuit of transistor 106, the impedance thereof varying in accordance with the variations in the light falling on the sensitive area of phototransistor 104, the repetition rate of which light variations is proportional to of the film speed of the HYCAM ® camera of the preferred embodiment.

Transistor 108 acts as an intermediate voltage amplifier, which is made necessary because film speed sensor 16 operates by reflected light, and thus produces very small signal variations in the emitter-collector circuit of phototransistor 104. The voltage signal occurring at the collector terminal of transistor 110 is the actual speed signal of the film speed control system of the preferred embodiment.

In adapting the film speed control system of the preferred embodiment to a high speed motion picture camera having a transmitted light film speed sensor, such as the Redlake FASTAX ® camera, transistors 106 and 108 may be elminated, e.g., by providing a shunt of the kind indicated by dashed line 111 in FIG. 2.

The designators 2R1, 4L2, etc., found adjacent the output lead of transistor 110 which extends to the right-hand edge of FIG. 2 will now be explained.

The schematic circuit diagram of the circuit of the preferred embodiment of the present invention is divided between different figures of the present drawings, viz., FIGS. 2 through 10.

Each link (i.e., interconnection having negligible impedance) extending between circuit points located in different ones of those figures of the drawings is specified herein by means of the following conventions:

1. From each of such circuit points there extends a lead which terminates adjacent an edge of the figure in which the point lies.

Example: The lead extending from the collector of transistor 110 to the right-hand edge of FIG. 2.

2. Each figure is assumed to have four of such edges (not shown) which together form a rectangle which is the locus of the ends of all such leads.
3. One of said four edges is arbitrarily designated as the top (or T) edge, and the other three edges are then designated the right-hand (or R), bottom (or B), and left-hand (or L) edges, in clockwise order.
4. Any lead which terminates adjacent an edge of a figure is considered to be, and is called, a terminal of that figure.
5. Each terminal of a figure of the drawings may be uniquely identified by a code designation, sometimes called a "home number", which may be easily deduced from the figure itself if not written adjacent that terminal.
6. Each home number consists of three terms: the first term, the middle (or alphabetic) term, and the third term.
7. The right-hand letter of the alphabetic term of every home number (or the single letter if there is only one letter) at the T-edge of every figure is T. The right-hand letter (or single letter if there is only one letter) of every home number at the R-edge of every figure is R. The right-hand letter of the alphabetic term (or single letter if there is only one letter in the alphabetic term) of the home numbers at the B and L edges are B and L, respectively. When the alphabetic term consists of more than one letter, all the letters of the alphabetic term but the right-hand letter are part of the figure designation.

Example: The home number 4L1 is located adjacent the uppermost lead extending to the left-hand edge of FIG. 4.

8. Every home number in each figure has as its first term the numerical part of the designation of that figure. When the alphabetic term is made up of more than one letter, all of the letters except the rightmost letter are part of the figure designation.
9. The third terms of the home numbers at any figure edge are identifying numerals assigned to the terminals at that edge. Along the R and L edges these identifying numerals generally increase in order from the T-edge toward the B-edge. Similarly, the identifying numerals (third terms) of the home numbers along the T and B edges increase in order from the L-edge toward the R-edge.
10. The home numbers of one or more other terminals will be found near certain terminals in the figures of these drawings. These remote terminal home numbers are called "remote numbers": and each serves to indicate the remote terminal to which the terminal adjacent it is linked, i.e., interconnected by an interconnection having negligible impedance. By "terminal adjacent it" in the previous sentence is meant the terminal adjacent to which the remote number is located.

The expression "terminal number" is used when a term generic to both home numbers and remote numbers is required. Specifying more than one link to interconnect any pair of points does not imply that more than one such link is to be used in constructing an embodiment of the invention; the redundant links are specified merely for convenience in circuit tracing and not to indicate necessary structure.

Figure 3:
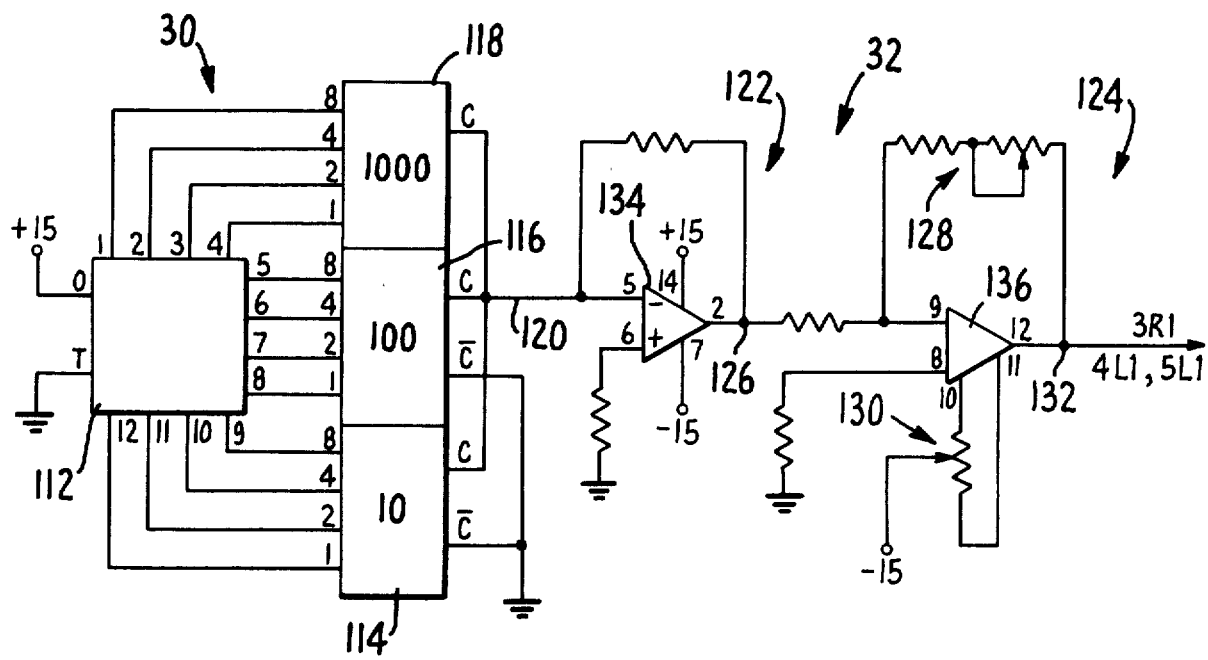
Figure 12:
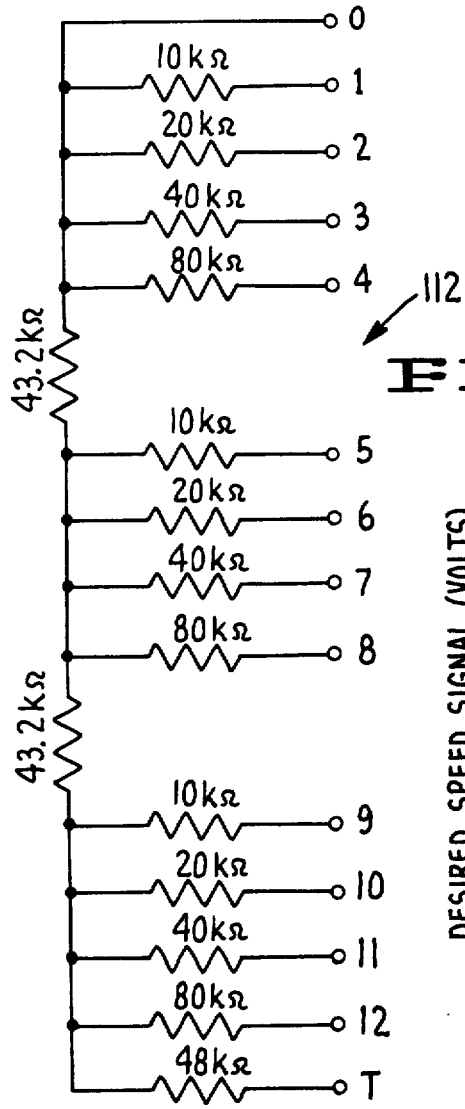
FIG. 12 is a schematic representation of a pre-packaged resistor network which is useful in carring out the present invention.

Referring now to FIG. 3, it will be seen that FPS selector 30 comprises a commercially packaged resistor network 112 of the kind sold by the Allen-Bradley Co. under the commercial designation FN130, and three thumbwheel decade switches 114, 116, 118, such as those sold by EECO, Inc. under the commercial designation 197636MN, interconnected as shown therein. The resistors etc., of the FN130 resistor network are shown in FIG. 12, in which the terminal designations correspond to the terminal designations found in FIG. 3.

As seen in FIG. 3, the zero terminal of resistor network 112 is connected to the positive terminal of a 15 volt direct current supply (not shown), and the T terminal of resistor network 112 is connected to system ground. Thus, as will be evident to those having ordinary skill in the art, a signal current will be produced in lead 120 (FIG. 3) which is proportional to the three digit number set on the three thumbwheel decade switches 114, 116, 118, i.e., proportional to the desired film speed in frames per second.

As also seen in FIG. 3, the FPS selector amplifier 32 comprises two operational amplifier stages 122 and 124. Stage 122 serves to convert the signal current in lead 120 into an equivalent voltage signal at point 126. Stage 124 comprises two potentiometers, whereby the magnitude and relative level of the voltage signal at point 132 may be adjusted, while maintaining the contour of the voltage signal at point 126.

As will be made apparent hereinafter, potentiometers 128 and 130 are among the adjustable elements which are adjusted during the calibration of the system of the preferred embodiment.

The selection of suitable operational amplifier integrated circuits 134, 136, as well as the values of the other components of stages 122 and 124, is within the scope of one having ordinary skill in the art, informed by the present disclosure.

Figure 4:
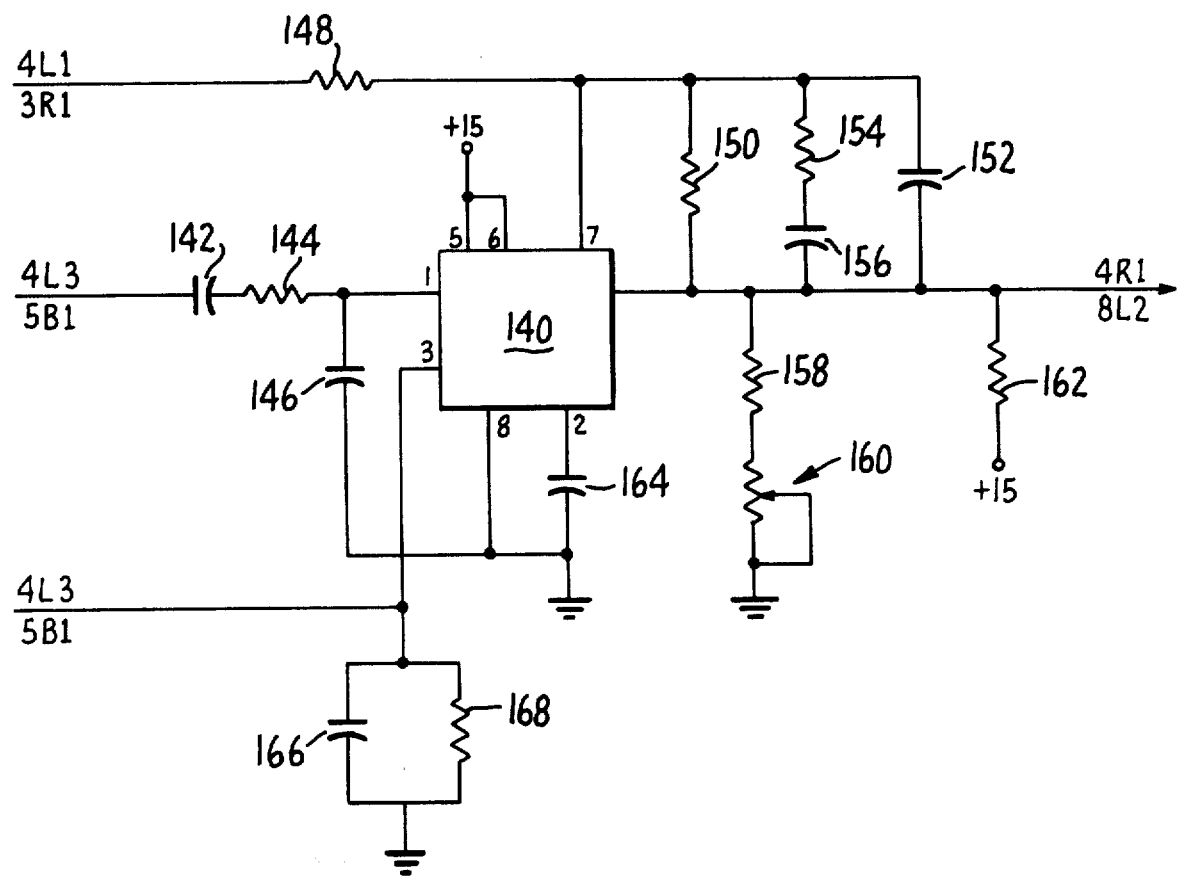

Referring now to FIG. 4, it will be seen that the circuit thereof comprises an integrated circuit 140. Integrated circuit 140 is an LM2907-8 integrated circuit of the kind made and sold by the National Semiconductor Corporation of Santa Clara, California, U.S.A. A schematic block and connection diagram of the LM2907-8 integrated circuit 140 is shown in FIG. 11.

Figure 11:
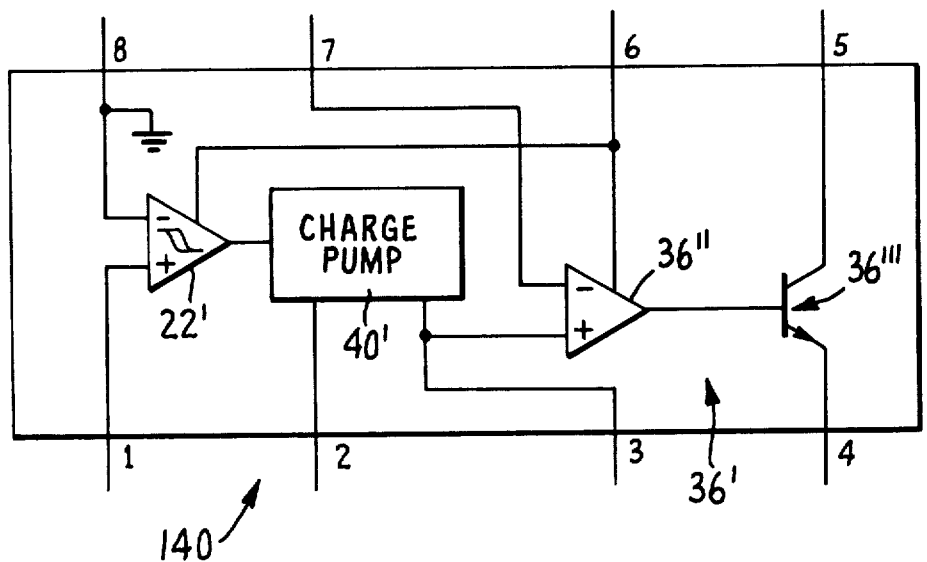
FIG. 11 is a schematic block diagram of an integrated circuit which is useful in carrying out the present invention.

Going to FIG. 11, it will be seen that the integrated circuit 140 includes the integrated circuit portions of hysterisis amplifier 22, charge pump 40, and comparator 36 (FIG. 1). As seen in FIG. 11, said integrated circuit portions of hysterisis amplifier 22, charge pump 40, and comparator 36 are respectively identified by the same reference numerals, primed. Thus, the integrated circuit portion of hysterisis amplifier 22 is identified in FIG. 11 by the reference numeral 22', etc.

As may be seen by comparison of FIGS. 2, 4, and 11, the actual film speed signal is applied to the ungrounded input terminal of hysterisis amplifier section 22' of integrated circuit 140 through a coupling capacitor 142 and a noise filter consisting of a resistor 144 and a capacitor 146, which serves to keep high frequency noise away from said input terminal of section 22'. In the preferred embodiment, capacitor 142 is a 0.1 microfarad capacitor, resistor 144 is a 1 kilohm resistor, and capacitor 146 is a 470 picofarad capacitor.

Comparing FIGS. 3 and 4, it will be seen that the desired film speed signal from point 132 is supplied to pin 7 of integrated circuit 140 via a resistor 148. It will also be seen that a resistor 150 is connected between pins 4 and 7 of integrated circuit 140. These resistors determine the basic direct current gain of the operational amplifier section 36" of integrated circuit 140. Resistor 148 is the input resistor of operational amplifier section 36", and is a 10 kilohm resistor. Resistor 150 is a feedback resistor for operational amplifier section 36", and is a 5.1 megohm resistor.

It is to be particularly noted that the feedback loop of operational amplifier section 36" consists not only of resistor 150 but also of two additional branches, one consisting of capacitor 152 only, and the other consisting of resistor 154 and capacitor 156. Thus, the dynamic performance characteristics of the operational amplifier section 36" of comparator section 36' depend upon the electrical characteristics of the three branches connected in parallel between pins 4 and 7 of integrated circuit 140.

By comparison of FIGS. 4 and 11, it will be seen that the emitter follower section 36''' of integrated circuit 140 is biased by a network (FIG. 4) consisting of resistor 158, potentiometer 160, and resistor 162, and determines the lower voltage limit at pin 4 of integrated circuit 140. Thus, this network serves to determine the maximum phase angle over which the silicon-controlled rectifiers of drive motor power supply circuit 52 can operate, and consequently serves to limit the maximum power which can be supplied to drive motor 14. This feature of the present invention is of great importance because if the camera is supplied from an overvoltage line, without the protection of this feature of the present invention, the result can be repeated film breakage, or even complete failure of the camera to operate.

In the preferred embodiment, resistor 158 is a 1 kilohm resistor, potentiometer 160 is a 2 kilohm potentiometer, and resistor 162 is a 16 kilohm resistor.

As seen in FIG. 11, pin 3 of integrated circuit 140 is the output terminal of the charge pump section 40' thereof. Pin 2 is the terminal of integrated circuit 140 to which the timing capacitor 164 of the charge pump circuit is connected. The timing capacitor 164 of the preferred embodiment is a 200 picofarad capacitor. For optimum operation of the device of the preferred embodiment, the capacitance value of capacitor 164 should lie within the range extending from 180 picofarads to 220 picofarads, and should be a substantially thermal drift free capacitor, e.g., a mica capacitor.

As will be seen by comparison of FIGS. 4 and 11, by those having ordinary skill in the art, informed by the present disclosure, pin 3 of integrated circuit 140 is not only the output terminal, i.e., internally connected to the output terminal, of charge pump section 40', but is also the input terminal, i.e., internally connected to the input terminal, of the comparator section 36' of integrated circuit 140.

Thus, as will be evident to those having ordinary skill in the art, informed by the present disclosure, the voltage across the parallel combination of capacitor 166 and resistor 168 (FIG. 4) is the actual film speed signal which is applied to the positive input terminal of the operational amplifier section 36" of integrated circuit 140, which functions to compare this actual film speed signal with the desired film speed signal applied to pin 7, and to produce at its output terminal a difference signal which, after being conditioned by emitter follower section 36''' and its associated external network 158, 160, 162, is the error signal of the film speed servocontrol system of the present invention.

In the preferred embodiment, capacitor 166 is a 0.1 microfarad capacitor, and resistor 168 is a 75 kilohm resistor. As will be evident to those having ordinary skill in the art, informed by the present disclosure, the value of resistor 168 serves to determine the amplitude of the output voltage of charge pump section 40' (pin 3) which corresponds to any particular value of actual film speed.

As will now be understood by those having ordinary skill in the art, informed by the present disclosure, certain parameters of the circuit of FIG. 4 and certain parameters of the FPS selector amplifier circuit of FIG. 3 must be relatively adjusted so that the voltages at pins 3 and 7 of integrated circuit 140 will be equal whenever the value of the desired film speed set on decade switches 114, 116, 118 is equal to the actual film speed sensed by film speed sensor 16. This adjustment is accomplished in the device of the preferred embodiment by adjusting the sliders of potentiometers 128 and 130 (FIG. 3) during the calibration of the device of the preferred embodiment.

Figure 13:
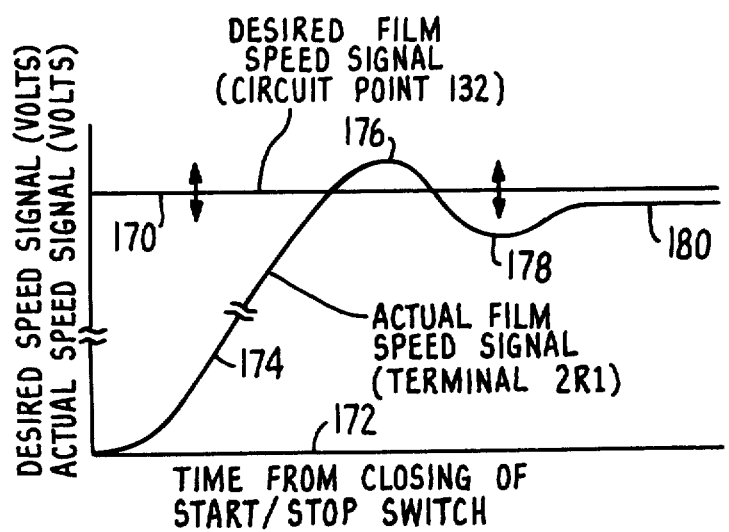
FIG. 13 represents a desirable film speed control system operating characteristic which is achieved in certain embodiments of the present invention.

Experience with the film speed control system of the preferred embodiment in HYCAM ® cameras shows that the response thereof to the closing of the start/stop switch, i.e., the actual film speed plotted against the elapsed time from the closing of the start/stop switch, is generally as shown in idealized form in FIG. 13. The distance of the desired film speed line 170 above the horizontal axis 172 of the figure will, of course, vary directly with the setting of the decade switches 114, 116, 118. The actual film speed curve 174 is generally found to take the highly desirable form shown in FIG. 13, which in some ways closely resembles the step response plot of a relay type displacement servo. That is to say, the typical system response curve of the device of the preferred embodiment, when the device of the preferred embodiment is correctly adjusted, is characterized by two and only two lobes 176, 178, immediately whereafter it settles, smoothly and without substantial perturbations, into a linear, horizontal segment 180, which continues substantially unchanged until the camera is shut down, e.g., by operation of the end of film sensor. It is to the achievement of this highly desirable operational characteristic that many of the advantages of the film speed control system of the present invention are attributable.

It is believed that the achievement by the present invention of the highly desirable typical system response curve idealized in FIG. 13 is due in major part to the wide linearity range charge pump (40, FIG. 1) which constitutes a characteristic feature of the present invention.

Additionally, the particular circumstance that the major parts of both of several characteristic elements of the present invention are available in a single integrated circuit makes it possible to provide, in accordance with the teachings of the present invention, a film speed control system which is characterized by an unprecedentedly low parts count, high inherent reliability, and great compactness.

It is to be understood, however, that the scope of the present invention is not limited to film speed control systems employing the LM2907-8 integrated circuit.

Other hysterisis amplifiers are well-known to those having ordinary skill in the art, e.g., as differential amplifiers driven by positive feedback flip-flops. See, for example, section 19.3 of the well-known reference work *Electronics Designers' Handbook* (Second Edition), edited by L. J. Giacoletto, published by the McGraw-Hill Book Company, New York, 1977.

Further, highly linear charge pumps are also well known to those having ordinary skill in the art. See, for example, section 19.5 of the abovesaid well-known reference work edited by L. J. Giacoletto.

Going now to FIG. 5, there is shown the circuit of the half speed detector 70 of the film speed control system 10 (FIG. 1) of the preferred embodiment of the present invention. As will be evident to those having ordinary skill in the art, informed by the present disclosure, integrated circuit comparator 182 receives on its positive terminal 184 a signal representative of the desired film speed set on decade switches, 114, 116, 118 (FIG. 3), and receives on its negative terminal 186 a signal representative of the actual film speed. The output signal of half speed detector 70 at point 188 is applied to the drive motor control circuit 50 (FIG. 1). As may be understood from FIG. 13, the difference between the desired film speed signal and the actual film speed signal is initially, i.e., at the time of closing of the start/stop switch, very great. Thus, resistors 183 an 185 being equal, the potential at terminal 184 will represent one-half of the desired film speed, while the potential on terminal 186 will be near zero. It follows, then, that capacitor 190 will commence to charge through resistor 187. If the potential at terminal 186 has not reached or exceeded the potential at terminal 184 before the upper terminal of capacitor 190 has reached 10 volts, SCR 193 will be fired, and thus the camera of the preferred embodiment will be shut down.

Suitable values and type designations for the components of the half speed detector circuit of FIG. 5 may be chosen by those having ordinary skill in the art without the exercise of invention or undue experimentation.

Figure 6:
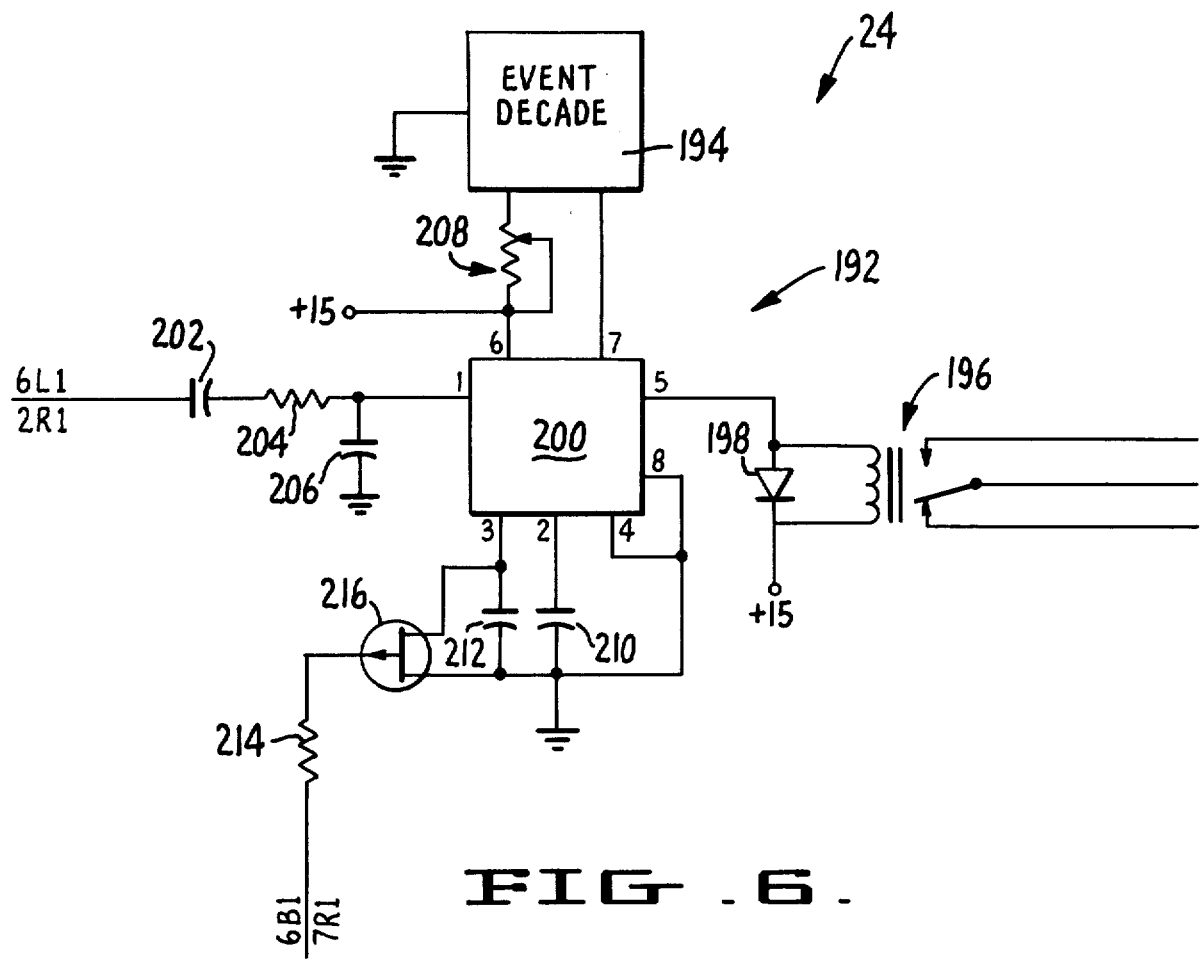

Referring now to FIG. 6, there is shown the circuit 192 of event trigger 24 (FIG. 1) of the preferred embodiment of the present invention.

Event trigger circuit 192 comprises an event decade 194 which may, e.g., be an EECO 2B96-02M, 10 kilohm variable resistance network, the analogue equivalent of which is a 10 kilohm potentiometer having its slider terminal connected to the upper end of potentiometer 208, one of its fixed terminals connected to pin 7 of integrated circuit 200, and its other fixed terminal grounded/.

Event trigger circuit 192 further comprises a triggering relay 196 of well-known type, the coil of which is provided with a transient suppressing diode 198 in the well-known manner.

The integrated circuit 200 event trigger circuit 192 is a LM2907-8 integrated circuit, a schematic diagram of which is shown in FIG. 11.

The actual film speed signal produced at the output terminal of the speed sensor amplifier 20 (FIG. 2) is applied to pin 1 of integrated circuit 200 via a network comprising a 0.1 microfarad capacitor 202, a 1 kilohm resistor 204, and a 470 picofarad capacitor 206.

As may be seen from FIG. 11, pin 1 of integrated circuit 200 is connected directly to the ungrounded input terminal of hysterisis amplifier section 22' of integrated circuit 200. It follows that the actual film speed signal applied to pin 1 of integrated circuit 200 is a condition of the signal applied to the positive input terminal of differential amplifier section 36".

As will also be seen by comparison of FIGS. 6 and 11, event decade 194 supplies a direct current voltage signal to the negative input terminal of differential amplifier section 36" of integrated circuit 200. The relative level of the signal supplied by event decade 194 may be adjusted for calibration purposes by potentiometer 208.

Since the emitter of emitter follower section 36''' is grounded, and the collector thereof is connected to the positive terminal of a 15 volt supply via the coil of relay 196, relay 196 will be energized when the signal at the output of charge pump section 40' (pin 3), which is directly connected to the positive terminal of differential amplifier section 36", exceeds the signal supplied by event decade 194 to the negative terminal of differential amplifier 36". The energization of relay 196 will serve to trigger events to be photographed by the camera of the preferred embodiment in the well-known manner.

Experience with the device of the preferred embodiment indicates that capacitor 210 should be a capacitor of the same type and capacitance value as capacitor 164 of FIG. 4. Capacitor 212 may be a 22 microfarad capacitor, resistor 214 may be a 470 kilohm resistor, and MOSFET 216 may be a J177 MOSFET. MOSFET 216 serves to disenable event trigger circuit 192 until it receives a signal from the stop/run circuit of FIG. 7 via sheet interconnection 6B1/7R1.

It is to be particularly understood that the event trigger circuit of FIG. 6 is characterized by much greater accuracy than has been achieved in prior art event trigger circuits for use in high speed motion picture cameras of the HYCAM ® type. This great accuracy of operation is attributed to the very great linearity of the charge pump of this circuit. It is also believed that the unique combination of a hysterisis amplifier and a charge pump, which combination is a characteristic feature of the event trigger circuits falling within the scope of the present invention, is responsible for the unequaled accuracy thereof. As will be evident to those having ordinary skill in the art, this great operational accuracy of the event trigger circuits of the present invention provides great economic advantage, since it makes it possible to secure more useful pictures per foor of film than was the case with devices of the prior art.

Figure 7:
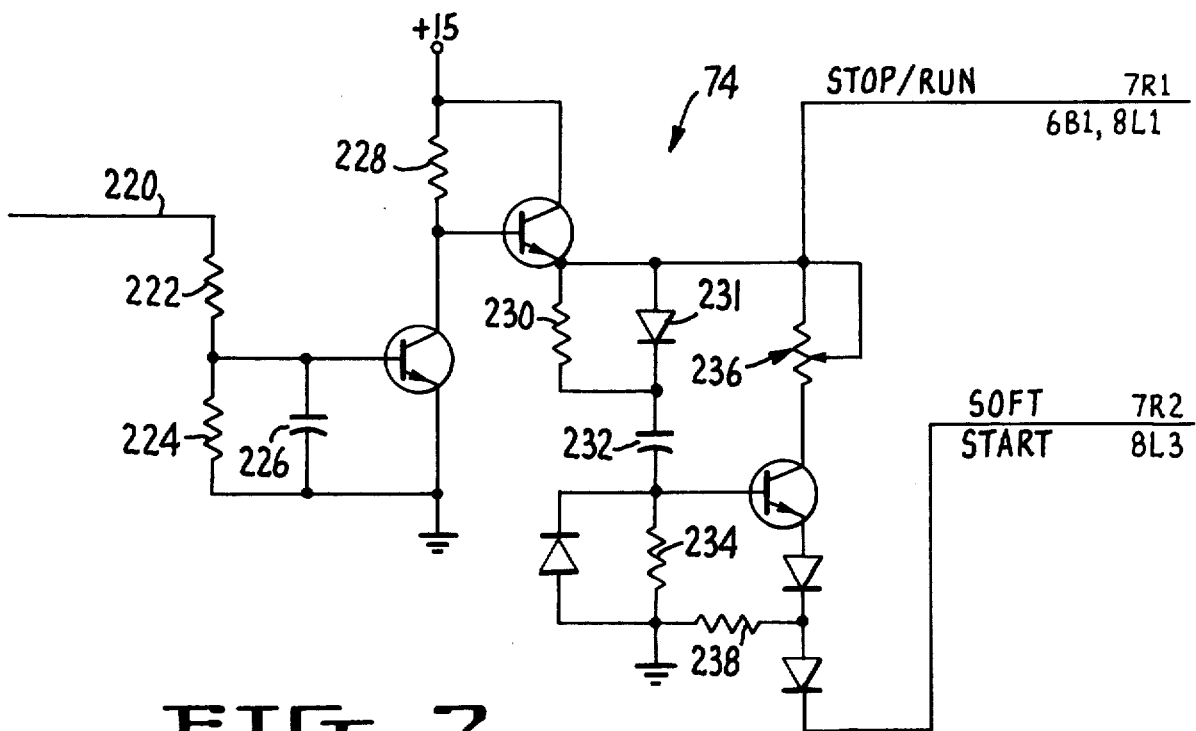

Referring now to FIG. 7, there is shown the combined stop/run and soft/start circuit (or start circuit) 74 of the film speed control system of the present invention.

As will be understood from FIG. 1, the actuating signals for the circuit of FIG. 7 are provided by the start/stop switch and end of film sensor combination 72.

These actuating signals are received by start circuit 74 via input lead 220 (FIG. 7). The signal voltage on lead 220 is high (i.e., approximately 5 volts positive, direct current) except when the camera contains film and the start/stop switch is in the run (closed) position.

The provision of a circuit for providing such a signal voltage from the operation of the start/stop switch and the end-of-film sensor of a HYCAM ® type camera lies within the scope of one having ordinary skill in the art, and thus no such circuit is shown or described herein.

Experience with HYCAM ® cameras embodying the present invention indicates that the stop/run and soft/start circuits which together are identified herein as start circuit 74 reduce the start delay time, and render it repeatable from camera to camera, to a degree unexampled in the prior art. Further, this same experience indicates that start circuit 74 makes the start delay time independent of the ultimate running speed, to a degree never achieved in the prior art.

As will be appreciated by those having ordinary skill in the art, this achievement of the present invention is of very great importance in certain critical applications of high speed motion picture cameras in which multiple cameras, started by a common start signal, are employed.

Put differently, the start circuit 74 of the present invention strongly tends to improve the performance curve, i.e., plot of pictures-per-second versus elapsed-time-from-start curve, of HYCAM ® type cameras embodying the present invention by making the settling line locus substantially parallel to the pictures-per-second axis. This is a desideratum the achievement of which in HYCAM ® type cameras has long been sought.

While the present invention is not limited to the employment of any one particular set of component values in start circuit 74, the following component values have been used in a version of start circuit 74 which manifested the improved performance, etc., described immediately hereinabove: resistor 222, 2.2 kilohms; resistor 224, 470 ohms; capacitor 226, 0.1 microfarads; resistor 228, 3.9 kilohms; resistor 230, 10 kilohms; capacitor 232, 22 microfarads; resistor 234, 100 kilohms; potentiometer 236, 1 kilohm; resistor 238, 10 kilohms. The transistors and diodes of start circuit 74 are not critical, and may be selected by one having ordinary skill in the art, to achieve the purposes of this aspect of the present invention, without the exercise of invention or undue experimentation.

Figure 8:
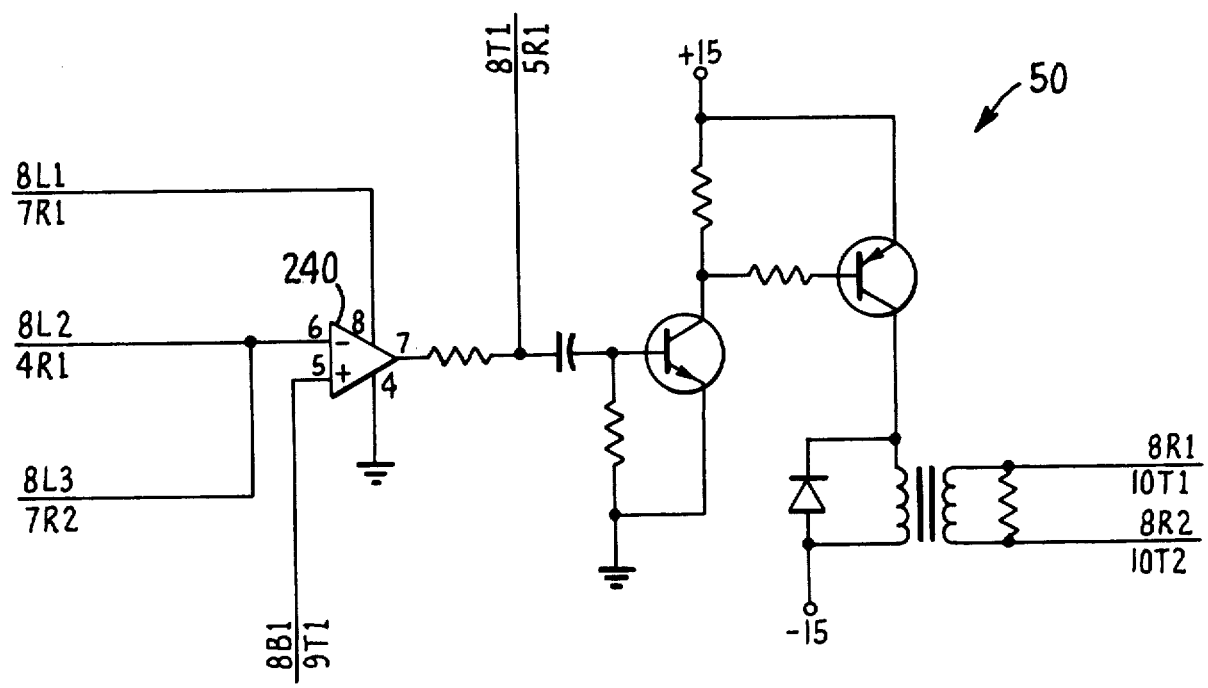

Referring now to FIG. 8, there is shown the drive motor control circuit 50 of the preferred embodiment of the present invention. In that circuit, the integrated circuit operational amplifier 240 compares the error signal of the system (pin 6) with the sawtooth wave signal supplied by the sawtooth generator 54 of FIG. 9, and causes the voltage signal on output pin 7 to go high, i.e., to about 15 volts positive, direct current, whenever the voltage of the sawtooth signal exceeds the voltage of the error signal. Thereafter, for the remainder of the then obtaining alternating supply voltage node, the drive motor power circuit 52 of FIG. 10 will be caused by the drive motor control circuit 50 to supply power to drive motor 14, in the well-known manner. As will be evident to those having ordinary skill in the art, drive motor control circuit 50 is also controlled by half speed detector 70 and start circuit 74, by means of and in ways which will be obvious to those having ordinary skill in the art, informed by the present disclosure. The provision of suitable component values and types for the circuit of FIG. 8 is within the scope of those having ordinary skill in the art, without the exercise of invention or undue experimentation.

Figure 9:
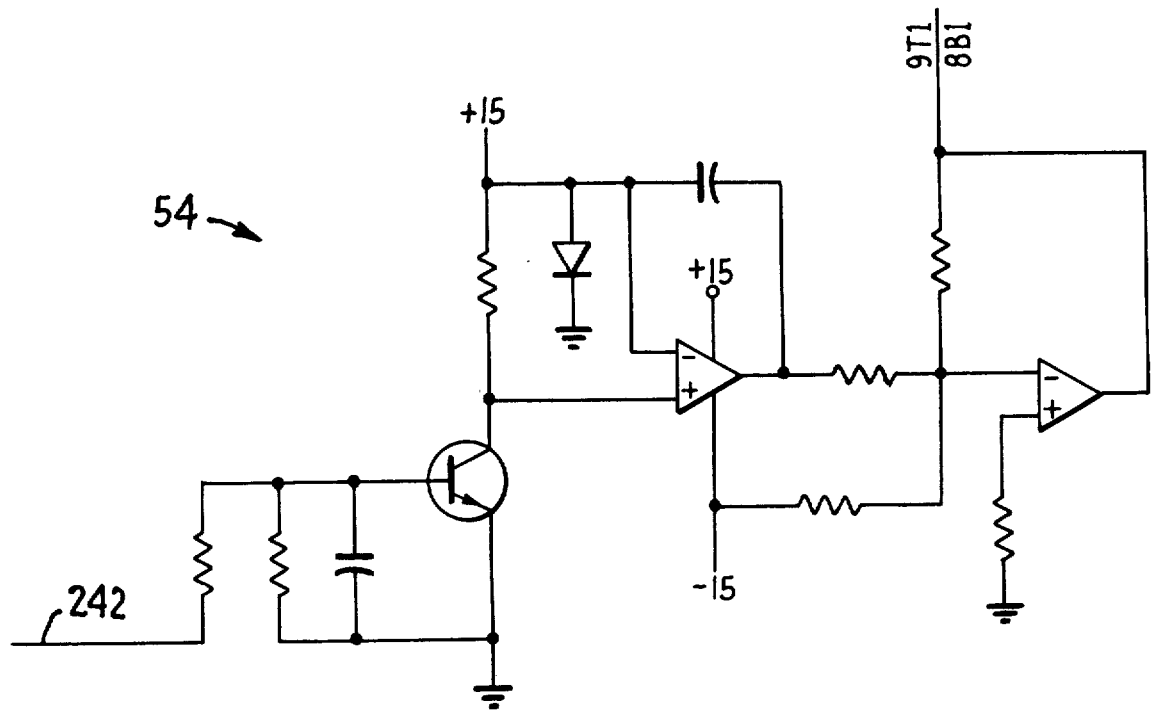

Referring now to FIG. 9, there is shown the sawtooth wave generator 54 of the film speed control system of the preferred embodiment of the present invention. In the well-known manner, sawtooth generator 54 is excited by a full-wave rectified version of the alternating current supply voltage wave, as derived from plug 56 (FIG. 1), this full-wave exciting signal being supplied by a full-wave bridge rectifier which is part of the direct current power supply 62 (FIG. 1). The provision of suitable component values and types for use in sawtooth generator circuit 54 is within the scope of those having ordinary skill in the art, without undue experimentation.

Figure 10:
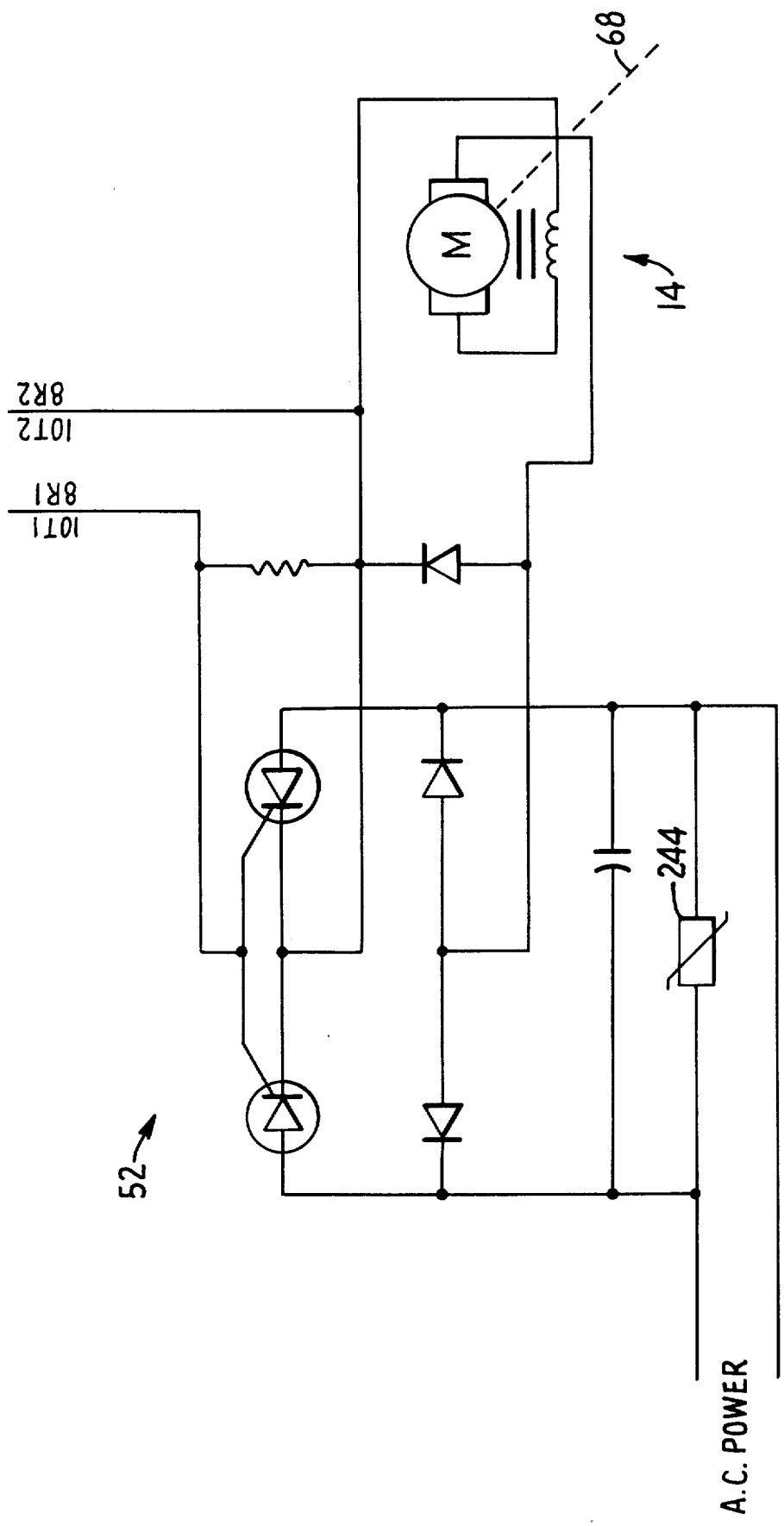

Going now to FIG. 10, there is shown the drive motor power supply circuit 52, and the drive motor 14, of the film speed control system of the preferred embodiment of the present invention. The provision of a suitable drive motor power supply circuit and a suitable drive motor for a HYCAM ® type camera is within the scope of one having ordinary skill in the art, and does not constitute a part of the present invention, but rather the diagrams of these parts of the film speed control system 10 of the present invention are included herein in order to provide full disclosure thereof. It should be noted, however, that it is preferred to incorporate in such a drive motor power supply circuit, in accordance with the principles of the present invention, a metallic oxide varistor 244, in order to protect the film speed control system 10.

It will thus be seen that the objects set forth above, among those made apparent from the preceding description, are efficiently attained, and, since certain changes may be made in the above constructions without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention herein describjed, and all statements of the scope of the invention which, as a matter of language, might be said to fall therebetween.

Having described my invention, what I claim as new and desire to secure by Letters Patent is:

1. A film speed control system for high speed motion picture cameras, comprising:
   actual film speed signal source means for producing an actual film speed signal representing the speed of the film in a high speed motion picture camera;
   selected film speed signal source means for producing a selected film speed signal representing a selected speed of operation of said high speed motion picture camera;
   charge pump means responsive to said actual film speed signal to produce an output signal the magnitude of which is substantially linearly related to said actual film speed signal over a range extending at least from ten thousand pulses per second to forty thousand pulses per second; and
   comparing means for comparing said selected film speed signal and said output signal.

2. A film speed control system as claimed in claim 1, further comprising hysterisis amplifier means for eliminating noise from said actual film speed signal before it is received by said charge pump means.

3. A film speed control system as claimed in claim 1 in which said comparing means is a comparator.

4. A film speed control system as claimed in claim 2, in which said comparing means is a comparator.

5. A film speed control system for high speed motion picture cameras, comprising:
   actual film speed signal source means for producing a pulse train signal the pulse repetition rate of which is proportional to the speed of the film in a high speed motion picture camera;
   film speed selecting means for selecting the speed of the film in said camera;
   selected film speed signal source means for producing a selected film speed signal the magnitude of which is proportional to the selected film speed;
   charge pump means responsive to said pulse train signal to produce an output signal the magnitude of which is substantially linearly related to said pulse repetition rate over a range extending at least from ten thousand pulses per second to forty thousand pulses per second;

comparing means for comparing said selected film speed signal and said output signal and producing a corresponding error signal; and film drive control means for controlling the film driving means of said camera in accordance with said error signal.

6. A film speed control system as claimed in claim 5, further comprising hysterisis amplifier means for eliminating noise from said pulse train signal before it is received by said charge pump means.

7. A film speed control system as claimed in claim 5 in which said comparing means is a comparator.

8. A film speed control system as claimed in claim 6 in which said comparing means is a comparator.

9. A film speed control system for high speed motion picture cameras, comprising:

actual film speed signal source means for producing a pulse train signal the pulse repetition rate of which is proportional to the speed of the film in a high speed motion picture camera;

charge pump means responsive to said pulse train signal to produce an output signal the magnitude of which is substantially linearly related to said pulse repetition rate;

event delay selecting means for selecting the magnitude of the delay interval between the actuation of said high speed motion picture camera and the production of a trigger signal to be used for triggering an event to be photographed by said high speed motion picture camera;

event delay time signal source means for producing an event delay time signal the magnitude of which varies in accordance with the selected delay time interval;

comparing means for comparing said output signal and said event delay time signal and producing an event time signal following the actuation of said high speed motion picture camera by said delay interval; and trigger signal producing means for producing said trigger signal in response to said event time signal.

10. A film speed control system as claimed in claim 9, further comprising hysterisis amplifier means for eliminating noise from said pulse train signal before it is received by said charge pump means.

11. A film speed control system as claimed in claim 9, in which said comparing means is a comparator.

12. A film speed control system as claimed in claim 10, in which said comparing means in a comparator.

13. A film speed control system as claimed in claim 9 in which said event delay selecting means comprises digital switch means and associated resistor means.

14. A film speed control system as claimed in claim 10 in which said event delay selecting means comprises digital switch means and associated resistor means.

* * * * *